United States Patent [19]
Mazziotto et al.

[11] Patent Number: 5,301,234
[45] Date of Patent: Apr. 5, 1994

[54] RADIOTELEPHONE INSTALLATION FOR PREPAYMENT OPERATION WITH SECURITY PROTECTION

[75] Inventors: Gérald Mazziotto, Paris; Philippe Hiolle, Herouville-Saint-Clair, both of France

[73] Assignee: France Telecom, Paris, France

[21] Appl. No.: 773,315

[22] Filed: Oct. 10, 1991

[30] Foreign Application Priority Data

Oct. 10, 1990 [FR] France .................. 90 12510

[51] Int. Cl.$^5$ .................................. H04L 9/32
[52] U.S. Cl. .................................. 380/23; 380/9;
380/21; 380/43; 380/49; 379/58; 379/59;
340/825.31; 340/825.34; 455/33.1; 455/54.1
[58] Field of Search .......... 340/825.31, 825.34;
379/58, 59; 455/33.1, 53.1, 54.1, 54.2, 56.1

[56] References Cited

U.S. PATENT DOCUMENTS 4,219,151 8/1980 Haruki .................. 380/23 X

FOREIGN PATENT DOCUMENTS

| | | | |
|---|---|---|---|
| 3439249 | 5/1986 | Fed. Rep. of Germany | H04K 1/00 |
| 3401562 | 7/1986 | Fed. Rep. of Germany | H04K 1/00 |
| 2225689 | 6/1990 | United Kingdom | H04Q 7/04 |

OTHER PUBLICATIONS

Une application de la carte a microprocesseur: le module . . . , "L'echo des Recherches," No. 139, 1st quarter of 1990, pp. 13-20, Authors: P. Jolie and G. Mazziotto.
Le systeme cellulaire numberique europeen . . . , "L'echo des Recherches," No. 131, 1st quarter of 1988, pp. 5-16, Authors: B. Ghillebaert, P. Combescure and A. Maloberti.
Electrical Communication, vol. 63, No. 4, 1989, Romford, GB, pp. 389-399; M. Ballard et al.: "Cellular Mobile Radio as an Intelligent Network Application".
Hasler—Mitteilungen, vol. 45, No. 4, Dec. 1986, Bern, Switzerland, pp. 75-83; R. Kunz: "Die Chip-Karte-Multifunktionskarte der Zukunft".

*Primary Examiner*—Bernarr E. Gregory
*Attorney, Agent, or Firm*—Foley & Lardner

[57] ABSTRACT

In the course of the intercommunication between the base station and the autonomous telephone set, the first means of authentication initially generates a keyword dependent on the call charge for the current service and transmits it to the autonomous telephone set. The second means of authentication then calculates the transform of the keyword by the encryption function F with the aid of the subscriber's secret key, and transmits the transform to the first means of authentication which finally checks the authenticity of the transform to totally block the intercommunication if the authenticity is not confirmed by the check.

14 Claims, 2 Drawing Sheets

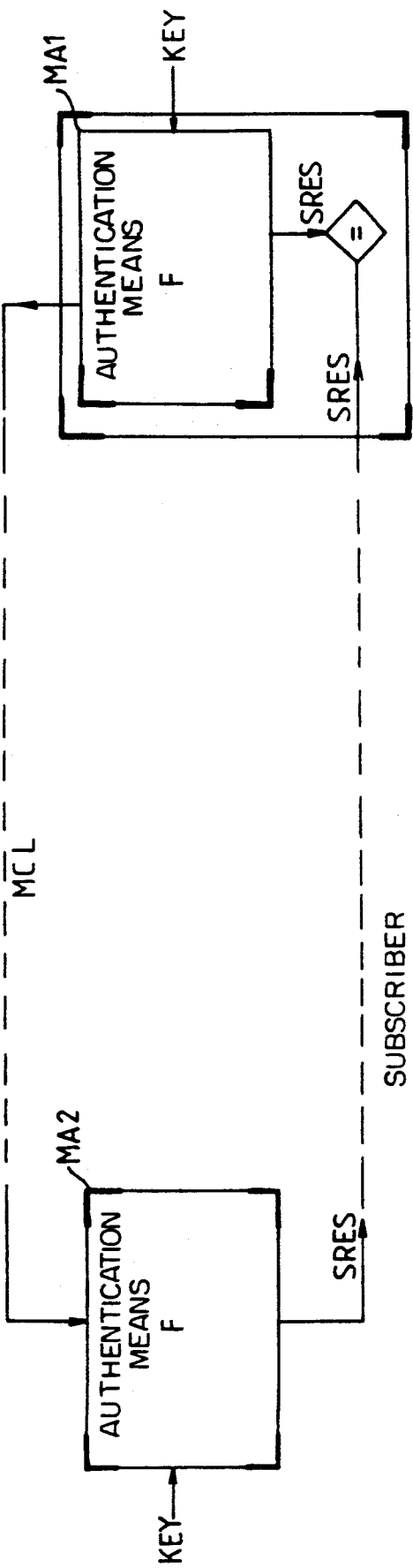
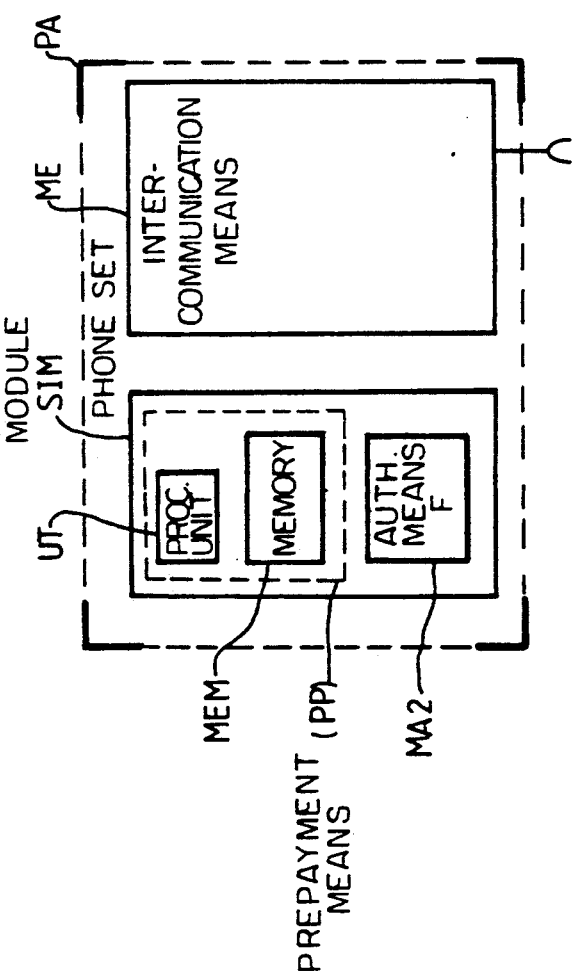
FIG.2
FIG.3

RADIOTELEPHONE INSTALLATION FOR PREPAYMENT OPERATION WITH SECURITY PROTECTION

BACKGROUND OF THE INVENTION

1. Field of the Invention

The invention relates to a radiotelephone installation for prepayment operation with security protection.

It is for general application in radio communications and more particularly in digital systems of communication with public mobile telephones operating in the 900 MHz band, also known as the Special Mobile Group (GSM), with autonomous telephone sets of the Pointel (registered trade mark) type, or with the mobile sets of the DECT (Digital European Cordless Telephone) type, etc.

2. Discussion of the Related Art

In general, such digital communications systems comprise:

- at least one switched telephone network;
- an autonomous telephone subscriber access system comprising at least one base station linked to the switched telephone network, first means of authentication capable of generating an encryption function F with the aid of a secret key which is personal to each subscriber, and means of charging capable of calculating the call charges for the chargeable services of the switched telephone network;
- at least one autonomous telephone set comprising means of establishing radiotelephone intercommunication with the base station, second means of authentication capable of generating the encryption function F with the aid of the secret key which is personal to the autonomous telephone set subscriber, and means of prepayment capable of receiving and paying the call charges calculated and transmitted by the charging means.

It is currently expected that the autonomous telephone set will access a chargeable service of the switched telephone network following a confirmed authentication of the identity of the autonomous telephone set subscriber using the first and second means of authentication.

It should be noted that the function used for the authentication of the subscriber and the encryption function F may be identical, or similar, or completely different from each other, or may use different secret keys.

In practice, the authentication of the identity of the autonomous telephone set subscriber is an authentication of the active type with the exchange between the autonomous telephone set and the access system of a random number and of the transform of this random number by the encryption function F using the secret key which is personal to the subscriber.

This authentication of the subscriber makes it possible only to ensure the authenticity of the subscriber and the authorization for this subscriber to access the chargeable radiotelephone services.

It does not enable the system engaged in the dialogue with the subscriber identified and authorized for access in this way to ensure the integrity of the means of prepayment receiving the call charges throughout the call.

Operators of such radio communications systems have observed that an abuser may create a blockage between the receiving prepayment means and the transmitting charging means on radio links which are already established, since the radio medium does not provide any physical protection.

Moreover, an abuser may fraudulently simulate, by appropriate means of processing, the entry of charging units in the receiving prepayment means (such as a prepayment card) since the means of prepayment which are used with the autonomous telephone set are not subject to any physical check of security or integrity by the operator.

Consequently, the current prepayment cards are not satisfactory for providing a secure prepayment service in a radiotelephone installation, particularly when the autonomous telephone set is located in a hired automobile which is not subject to any check by the hiring company.

SUMMARY OF THE INVENTION

The object of the present invention is to remedy these disadvantages.

The present invention, therefore, has the purpose of providing a radiotelephone installation capable of ensuring the confidentiality and the integrity of the call charges in their transmission between the transmitting charging means and the receiving prepayment means, and in the entry of these call charges into the receiving prepayment means.

The present invention is intended to ensure for the access system that the call charges transmitted by the charging means to the prepayment card, via the radio interface and the autonomous telephone set, have been correctly received and understood, and that they have actually been deducted from the prepaid unit counter of the prepayment card.

Another purpose of the invention is to use the means of authentication already present in the installation to authenticate the call charges throughout the duration of the call.

The invention is based on a radiotelephone installation comprising at least one switched telephone network. Also included is an autonomous telephone subscriber access system comprising at least one base station linked to the switched telephone network, first means of authentication capable of generating an encryption function F with the aid of a secret key which is personal to each subscriber, and means of charging capable of calculating the call charges for the chargeable services of the switched telephone network. Additionally included is at least one autonomous telephone set comprising means of establishing radiotelephone intercommunication with the base station, second means of authentication capable of generating the encryption function F with the aid of the secret key which is personal to the autonomous telephone set subscriber, and means of prepayment capable of receiving and paying the call charges calculated and transmitted by the charging means.

According to a general definition of the invention, during the intercommunication between the base station and the autonomous telephone set, the first means of authentication generates a keyword dependent on the call charge for the current service and transmits it to the autonomous telephone set. The second means of authentication then calculates the transform of the keyword by means of the encryption function F with the aid of the subscriber's secret key, and transmits the transform to the first means of authentication, which checks the authenticity of said transform to totally block the intercommunication if the authenticity is not confirmed by the check.

According to a preferred embodiment of the invention, the keyword comprises a random number and the call charge for the current service, and in response to the keyword, the second means of authentication calculate the transform of the random word by the encryption function F with the aid of the subscriber's secret key, while the means of prepayment receives and pays the call charge.

More precisely, the autonomous telephone set accesses a chargeable service of the switched telephone network following a confirmed authentication of the identity of the autonomous telephone set subscriber, using the first and second means of authentication.

The authentication of the identity of the autonomous telephone set subscriber is advantageously an authentication of the active type with the exchange between the autonomous telephone set and of the access system of a random number and of the transform of this random number by the encryption function F using the secret key which is personal to the subscriber.

According to one feature of the invention, the second means of authentication and the means of prepayment are located in a detachable subscriber identity module capable of operating in conjunction with the means of establishing radio intercommunication.

According to another feature of the invention, the means of prepayment comprises a memory protected against unauthorized direct entry of data by outside agencies and capable of containing data on the prepayment of call charges, and a processing unit capable of paying the call charges with the aid of said prepayment data.

In practice, the memory, MEM, is of the EPROM type.

According to another feature of the invention, the subscriber identity module is located in a ISO standard type card, and the means of establishing radio intercommunication comprises a reader for reading said card.

In another version, the subscriber identity module comprises a mechanical interface capable of being inserted into the means of establishing radio intercommunication.

BRIEF DESCRIPTION OF THE DRAWINGS

Other characteristics and advantages of the invention will be evident from an examination of the detailed description following, and of the attached drawings, in which:

FIG. 2 is a schematic illustration of the authentication of the call charges according to the invention; and FIG. 3 is a block diagram of an autonomous telephone set equipped with a subscriber identity module according to the invention.

DETAILED DESCRIPTION OF THE PREFERRED EMBODIMENT

Figure 1:
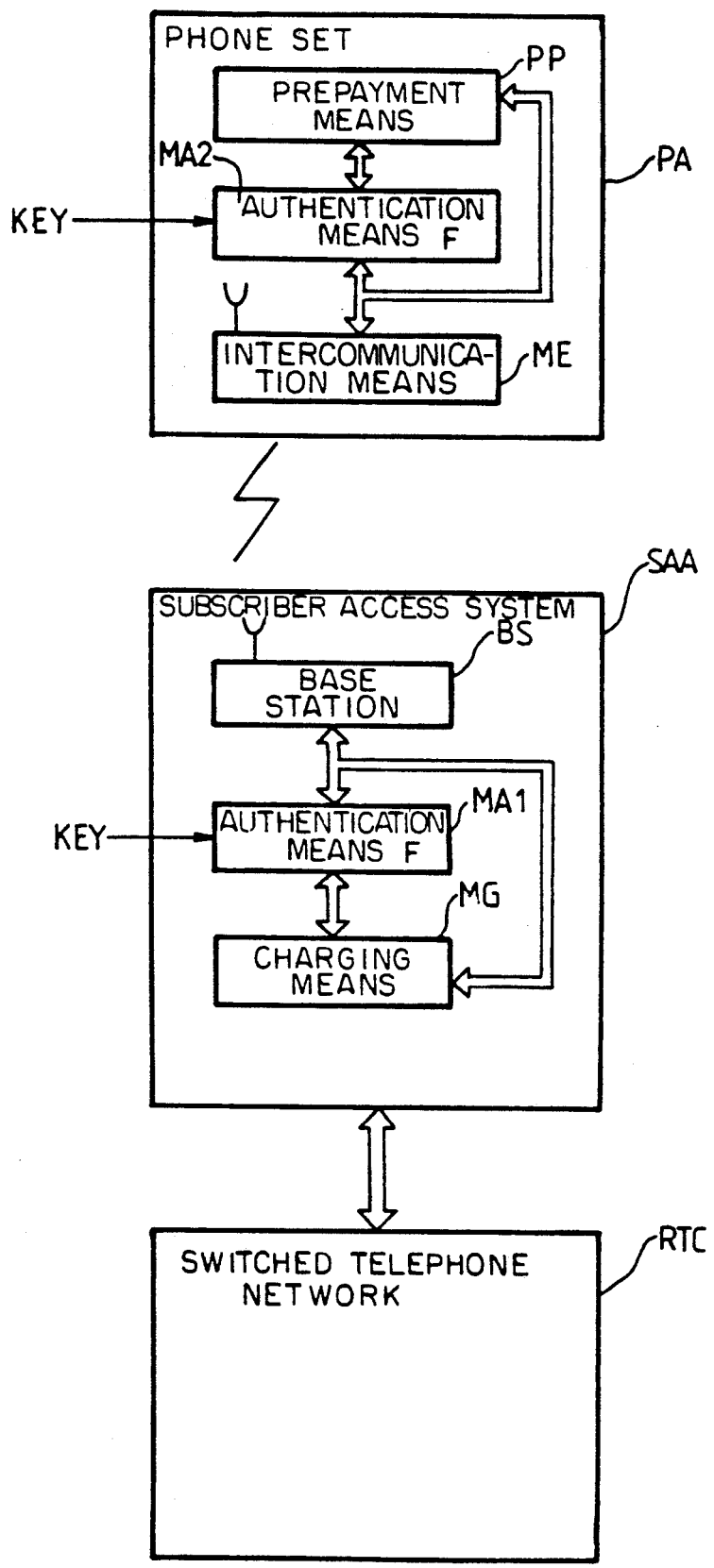
FIG. 1 is a block diagram of a radio installation of a known type.

In FIG. 1, a radiotelephone installation of known type puts into operation an autonomous telephone subscriber access system SAA comprising at least one base station BS linked to at least one switched telephone network RTC with at least one autonomous telephone set PA comprising means ME of establishing radio intercommunication with the base station BS.

An installation of this kind, for example that belonging to the Special Mobile Group (GSM), is described in the journal "L'echo des Recherches", No. 131, 1st quarter of 1988, pages 5 to 16, by B. Ghillebert, P. Combescure, and A. Maloberti, and in No. 139 of the same journal, 1st quarter of 1990, pages 13 to 19, by P. Jolie and G. Mazziotto.

In practice, the autonomous telephone subscriber access system SAA comprises at least one base station BS linked to the switched telephone network RTC, first means of authentication MA1 capable of generating an encryption function F with the aid of a secret key KEY which is personal to each subscriber, and means of charging MG capable of calculating the call charges CONS of the chargeable services of the switched telephone network RTC.

For its part, the autonomous telephone set PA comprises means ME of establishing radiotelephone intercommunication with the base station BS, second means of authentication MA2 capable of generating the encryption function F with the aid of the secret key KEY which is personal to the autonomous telephone set subscriber PA, and means of prepayment PP capable of receiving and paying call charges CONS calculated and transmitted by the charging means MG.

It should be noted that the above description of the GSM installation is equally applicable, as regards the principle of radio communication, to other radiotelephone installations such as those belonging to the French Pointel (registered trade mark) system and to the DECT system for which standards are currently being developed.

In practice, according to the standards specified by the GSM, the autonomous telephone set PA accesses a chargeable service of the switched telephone network RTC following a confirmed authentication of the identity of the autonomous telephone set subscriber PA, using the first and second means of authentication.

More precisely, the exchanges between the autonomous telephone set PA and the mobile access system SAA via the radio interface and the switched telephone network RTC are as follows.

Initially, the first means of authentication MA1 generate a random word RAND and transmit it to the autonomous telephone set PA via the radio interface.

The second means of authentication MA2 then calculate the transform of the random word SRES by the encryption function F with the aid of the secret key KEY which is personal to the subscriber.

Finally, the second means of authentication MA2 transmit said transform SRES to the access system SAA which consequently checks the authenticity of the transform SRES by comparing the SRES calculated and transmitted by the autonomous telephone set PA with the SRES calculated by the mobile access system SAA.

It is clear that the authentication is carried out at the start of the call in this case. In conventional installations, there is no further authentication during the intercommunication between the autonomous telephone set and the mobile access system.

At the present time, there is no service for prepayment of call charges of the chargeable services of the switched telephone network. There is a service for notification of subscriber information. More precisely, this service consists in the sending of parameters to the autonomous telephone set at the start of the call to permit the calculation of the cost of the call as a function of the time elapsed. In fact, it is the autonomous telephone set that measures this time and calculates the call charge which may be stored as if on a scratch pad, in a subscriber module which will be described in greater detail subsequently.

Consequently, this service of notification of charging information is unsatisfactory in that it offers no protection against fraud.

Reference will now be made to FIG. 2.

To ensure at the level of the access system SAA that the autonomous telephone set PA has actually received the value of the call charge incurred, provision is made, according to the invention, for proceeding in the course of the radiotelephone call to an active authentication of the call charge incurred.

More precisely, in the course of the call between the base station BS and the autonomous telephone set PA, the first means of authentication MA1 generates a keyword MCL dependent on the call charge for the current chargeable service of the switched telephone network, and transmits it to the autonomous telephone set PA.

The second means of authentication MA2 then calculates the transform SRES of said keyword MCL by the encryption function F with the aid of the subscriber's secret key KEY, and transmits said transform SRES to the access system SAA. It then, finally, checks the authenticity of said transform SRES and totally blocks the intercommunication if the authenticity is not confirmed by said check.

In practice, the keyword MCL comprises a random number RAND and the call charge CONS incurred for the current service.

Thus, in response to the keyword MCL the second means of authentication MA2 calculates the transform SRES of the random word by the encryption function F with the aid of the subscriber's secret key KEY, while the means of prepayment PP receives and pays the call charge incurred CONS.

According to a preferred embodiment of the invention, the means of charging MG combines, according to a generally known procedure (in other words means of authentication of autonomous telephone sets) the value of the call charges CONS and the random number RAND transmitted for this authentication.

For example, the keyword MCL, the random word RAND and the call charge incurred CONS may have sizes of 128, 124, and 4 bits respectively.

For example, the procedure used to form the keyword MCL from the random word RAND, and the call charge incurred CONS may be a bit-to-bit addition.

After the check of authenticity of the call charges incurred during the call, the autonomous telephone set PA should increase or decrease the means of prepayment PP by the value CONS and ensure that no unauthorized third party can modify its contents.

Reference will now be made to FIG. 3.

In practice, the means of prepayment PP comprises a memory MEM protected against unauthorized direct entry of data by outside agencies and capable of containing data on the prepayment of call charges CONS, and a processing unit UT capable of paying the call charges CONS with the aid of said prepayment data.

In the application of the invention in the Special Mobile Group GSM, the second means of authentication MA2 and the means of prepayment PP are advantageously located in the detachable subscriber identity module SIM which operates in conjunction with the means ME of establishing radio intercommunication of the autonomous telephone set PA.

The memory MEM is advantageously of the EPROM or $E^2PROM$ type correctly protected by the card logic.

As specified by the GSM standards, the subscriber identity module SIM may be located in an ISO standard type card. In this case, the means of establishing radio intercommunication ME comprises a reader for reading said card.

In another version, the subscriber identity module SIM may comprise a mechanical interface capable of being inserted into the means of establishing radio intercommunication ME.

Clearly, the procedure of authentication of the call charges incurred during a call according to the invention may be applied to any radio communication system with mobile sets equipped with means of authentication of the active type, in other words with the exchange of a random value and an encoded response. This procedure is equally applicable to the secure remote programming of charging data in mobile equipment where the subscriber identity module of this equipment contains the encryption algorithm for authentication and has a minimum of reserved write access memory.

In the same way, this procedure may be applied to the remote programming of various data in the subscriber identity module whenever the network requires an acknowledgement of receipt certified by said module.

A possible application of the invention in an architecture of the GSM type will now be described.

It should first be noted that the logical organization of the subscriber identity module SIM and the radio interface are specified in recommendation ETSI.GSM 11.11.

The application of the invention as regards the subscriber identity module SIM requires the definition of a new file, named for example PREPAID.

This file is freely readable and may be updated in a protected way by presentation of an administrative key. This means that an administrative authority empowered by the operator of the mobile network may write to this PREPAID file a value which represents the total value of prepaid use permitted to the possessor of the subscriber identity module SIM.

According to the invention, during a call the means of establishing radio intercommunication ME transmit the keyword MCL originating from the access system to the subscriber identity module SIM. The SIM module then extracts the value CONS and subtracts it from the contents of the file PREPAID.

If the value obtained is less than or equal to zero, the SIM module is blocked and the call cannot continue.

Otherwise, the SIM module calculates the transform SRES of the random word RAND by the encryption function F with the aid of the key KEY. The means of establishing radio intercommunication then retrieves the result of the calculation SRES.

At the network level, the SIM module carrying the call charge authentication application according to the invention is identified by a special subscriber identity which refers to a home location register, also called HLR, which is specific to the network. This HLR register may, for example, control all the SIM modules carrying the prepayment application according to the invention.

When the home location register HLR receives a call authorization request for a SIM carrying the application according to the invention, it sends to another register, called the VLR (for "Visitor Location Register"), a message comprising the random word RAND, the call charge incurred CONS, the mobile key KEY, and the transform of the random word SRES.

It should be noted that the calculation of the charge incurred and its authentication may also take place in the VLR register (which may be more advantageous for the signalling load of the network).

In this case there are two options.

In the first option, the authentication key KEY is transmitted from the home register HLR to the VLR register which then uses the same authentication algorithm as that of the HLR to proceed to authenticate the call charges.

In the second option, the home register HLR transmits to the VLR a session key furnished by the means of authentication of said HLR. The session key is therefore different from the secret key KEY. The VLR register and the subscriber module SIM then use for the authentication of the call charges an authentication algorithm having the session key as the secret authentication key.

The intercommunication may continue through a number of successive rates of charging. In this case, the number of authentication procedures to be provided will be equal to the number of successive charging rates.

Whenever the user of the SIM has used a value CONS of the resources of the network corresponding to a rate of charging (or before he is authorized to use this value, depending on the degree of confidence assigned by the operator), the network requests active authentication of the SIM module with the keyword MCL and waits for the response SRES before continuing the intercommunication.

It should be noted that the present invention is also applicable to the architecture of the Pointel (registered trade mark) system.

Thus the use of a prepaid card in the Pointel system is possible according to the invention despite the lack of security regarding the confidentiality of data exchanged and the possible intrusion of abusers.

According to the invention, a confidential and direct dialogue is provided between the two ends of the Pointel system (in other words between the receiving phonecard and the transmitting access system).

The sequence of Pointel procedures at the radio interface is therefore as follows.

Initially, the autonomous telephone set PA, provided with a prepayment phonecard PP, carries out a conventional call establishment procedure with the base station BS.

The mobile access system SAA then commences the procedure for authentication of the identity of the phonecard PP and the check of the right of access of this phonecard PP. To do this, the mobile access system SAA carries out a conventional authentication of the active type (in other words an exchange between the network and the autonomous telephone set of a random quantity RAND and an encoded response SRES).

According to the invention, the first means of authentication MA1 of the mobile access system SAA introduces the number of prepaid units used CONS into the random number RAND.

Then, in response to the keyword MCL consisting of the random number RAND and the number of prepaid units used CONS, the second means of authentication MA2 of the autonomous telephone set PA calculates the transform SRES of this keyword and transmits it to the first means of authentication MA1.

Finally, the first means of authentication MA1 proceeds to check the transform SRES of the random word by the encryption function F with the aid of the secret key KEY which is personal to the subscriber.

If the access check or authentication is not confirmed, the intercommunication is blocked. It should be noted that this authentication procedure is dependent on the access system SAA. In other words, the system may carry out this authentication whenever it wishes.

In the Pointel system, the authentication and metering are assigned to the terminal connection unit URB. As regards the authentication of the call charges, authentications should be carried out serially according to the invention throughout the intercommunication between the autonomous telephone set and the mobile means of action.

The mean number of authentications will be specified by the system operator as a function of the cost of signalling and the risk of charge loss incurred.

We claim:

1. A radiotelephone installation for use in communications systems in connection with a switched telephone network, comprising:
   (a) an autonomous telephone subscriber access system including
      (1) a base station linked to a switched telephone network,
      (2) first means of authentication for generating an encryption function F with the aid of a first secret key which is personal to each subscriber, and
      (3) means of charging for calculating a call charge for the chargeable services of the switched telephone network;
   (b) an autonomous telephone set including
      (1) means of establishing radiotelephone intercommunication with the base station,
      (2) second means of authentication for generating the encryption function F with the aid of a second secret key which is personal to the autonomous telephone set subscriber, and
      (3) means of prepayment for receiving and paying the call charge calculated and transmitted by the charging means,
   (c) wherein during the intercommunication between the base station and the autonomous telephone set, the first means of authentication generates a keyword dependent on the call charge for a current service and transmits said keyword to the autonomous telephone set, and wherein the second means of authentication calculates a transform of said keyword by the encryption function F with the aid of one of the secret keys and transmits said transform to the first means of authentication which checks the authenticity of said transform to totally block the intercommunication if the authenticity is not confirmed.

2. The installation as claimed in claim 1, wherein the keyword includes a random number and the call charge for the current service and wherein in response to said keyword the second means of authentication calculates the transform of the random number by the encryption function F with the aid of one of the secret keys while the means of prepayment receives and pays the call charge.

3. The installation as claimed in claim 1, wherein the autonomous telephone set accesses a chargeable service of the switched telephone network following a confirmed authentication of the identity of the autonomous telephone set subscriber, using the first and second means of authentication.

4. The installation claimed in claim 3, wherein the authentication of the identity of the autonomous telephone set subscriber is an authentication of the active type with the exchange between the autonomous telephone set and the access system of a random number and of the transform of the random number by the encryption function F using the first secret key which is personal to the subscriber.

5. The installation as claimed in claim 1, wherein the second means of authentication and the means of prepayment are located in a detachable subscriber identity module for operating in conjunction with the means of establishing radio intercommunication.

6. The installation as claimed in claim 5, wherein the means of prepayment includes a memory protected against unauthorized direct entry of data for containing data on the prepayment of call charges and a processing unit for paying the call charges with the aid of said prepayment data.

7. The installation as claimed in claim 6, wherein the memory is of the EPROM type with card logical protection.

8. The installation as claimed in claim 6, wherein the memory is of the $E^2PROM$ type with card logical protection.

9. The installation as claimed in claim 1, wherein the subscriber identity module is located in an ISO standard type card and wherein the means of establishing radio intercommunication includes a reader for reading said card.

10. The installation as claimed in claim 1, wherein the subscriber identity module includes a mechanical interface for being inserted into the means of establishing radio intercommunication.

11. The installation as claimed in claim 1, including at least one switched telephone network.

12. The installation as claimed in claim 1, wherein the autonomous telephone subscriber access system includes a plurality of base stations.

13. The installation as claimed in claim 12, including a plurality of autonomous telephone sets.

14. The installation as claimed in claim 1, including a plurality of autonomous telephone sets.

* * * * *